E. R. STOEKLE.
MOTOR CONTROL SYSTEM.
APPLICATION FILED MAR. 24, 1919.

1,426,123.

Patented Aug. 15, 1922.

INVENTOR.
Erwin R. Stoekle
BY Frank H. Hubbard
ATTORNEY

UNITED STATES PATENT OFFICE.

ERWIN R. STOEKLE, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROL SYSTEM.

1,426,123.      Specification of Letters Patent.      Patented Aug. 15, 1922.

Application filed March 24, 1919. Serial No. 284,665.

*To all whom it may concern:*

Be it known that I, ERWIN R. STOEKLE, a citizen of the United States, residing at Milwaukee, in the county of Milwaukee and State of Wisconsin, have invented new and useful Improvements in Motor-Control Systems, of which the following is a full, clear, concise, and exact description, reference being had to the accompanying drawing, forming a part of this specification.

This invention relates to motor control systems and more particularly to systems in which direct current motors are supplied from an alternating current source through rectifying means.

Although not limited thereto, the invention is particularly applicable to electric railway systems in which mercury arc rectifiers are employed for rectification of the alternating current and it has among its objects to provide simplified and efficient control means enabling exceedingly smooth acceleration of the motors of such systems.

Another object is to provide control means of the aforesaid character which will also enable speed regulation of the motors after acceleration thereof.

Another object is to provide control means of the aforesaid character which will function automatically.

Other objects and advantages of the invention will hereinafter appear.

The accompanying drawing illustrates certain embodiments of the invention, and the same will now be described, it being understood that the embodiments illustrated are susceptible of various modifications without departing from the scope of the appended claims.

Figure 1:
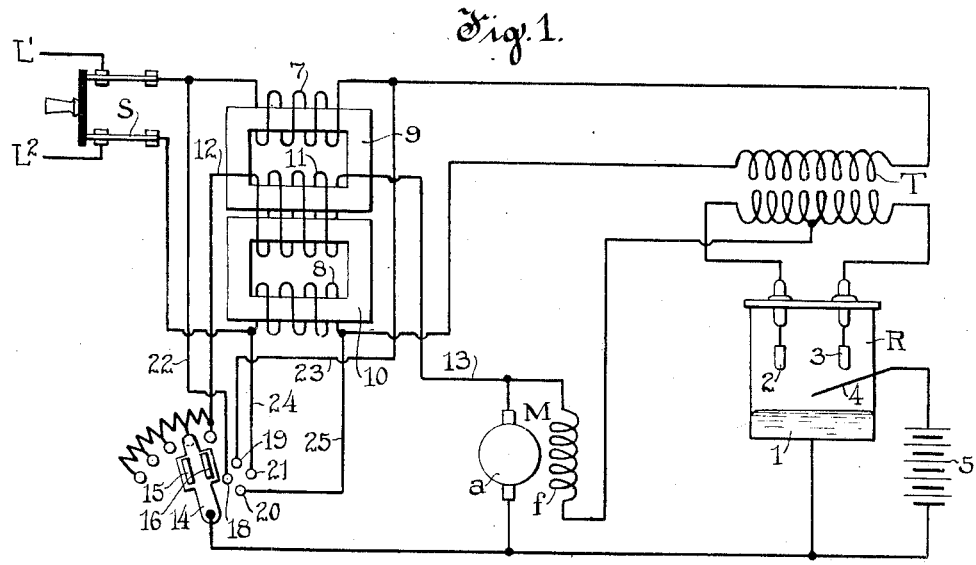
Figure 1 shows diagrammatically a system of control for a series motor.

Referring to Fig. 1, the same illustrates a direct current motor M having an armature $a$ and a series field $f$, an alternating current supply circuit L', L² therefor, a switch S, transformer T and mercury arc rectifier R, through which current is supplied to said motor, and control means hereinafter described. The rectifier R is shown as of a conventional double wave type, having a mercury cathode 1 connected to one terminal of the motor, anodes 2 and 3 connected to the end terminals of the secondary winding of transformer T and through a tap on said transformer winding to the opposite terminal of the motor. Also, the rectifier is provided with an auxiliary anode 4 connected to the cathode 1 and subjected to the potential of a battery 5 to provide a so-called "keep alive" circuit. The primary winding of the transformer T is connected across supply lines L' and L² and with the arrangement shown, the rectifier R rectifies both half waves of the alternating current supplied thereto, thus supplying a direct current to motor M.

The aforesaid control means includes a device known as a magnetic amplifier, said device including inductance coils 7 and 8 wound on cores 9 and 10 respectively and a coil 11 wound on adjacent parts of said cores. The inductance coils which are wound to send magnetic fluxes in opposite directions through adjacent legs of the cores are respectively connected between the terminals of the primary transformer winding and the supply lines, while the coil 11 is connected by conductors 12 and 13 across the terminals of the motor armature through a rheostat 14. The arm of the rheostat is movable to a position to interrupt the circuit of coil 11 and carries contacts 15 and 16 adapted when said arm occupies such position to respectively bridge contacts 18—19 and 20—21 to short circuit coils 7 and 8. Contacts 18 and 19 are respectively connected to opposite terminals of coil 7 by conductors 22 and 23 while contacts 20 and 21 are respectively connected to opposite terminals of coil 8 by conductors 24 and 25.

Thus assuming an initial supply of rectified current of motor M for starting the same, the rheostat arm being in the position shown to complete the circuit of coil 11, but to exclude therefrom all resistance, the coils 7 and 8 function in a well known manner to curtail the current supplied to the transformer, hence restricting the rectified current supplied to the motor. When the motor is initially set in operation the potential difference between the armature terminals is relatively small so that little current is supplied to the coil 11 with a negligible effect of said coil. But as the motor speeds up such potential difference increases with the result of increasing the current supplied to coil 11 and an increase in current through said coil effects a decrease in the inductance of coils 7 and 8 thereby allowing more current to flow through the motor. Accordingly, as the motor gradually increases in speed it effects a correspondingly graduated increase in the E. M. F. applied to the primary of the transformer until almost the full line E. M. F. is applied. Then if the rheostat arm be adjusted to short circuit the coils 7 and 8, the full line E. M. F. is applied to the transformer primary winding for maximum speed and torque of the motor. On the other hand, the speed of the motor may be thereafter decreased by adjusting the rheostat to again include in circuit the coils of the magnetic amplifier and to include resistance in the circuit of coil 11, the amount of resistance determining the speed reduction. Also, the rheostat may be set prior to starting, to limit the acceleration of the motor for any predetermined maximum speed and if desired the winding 11 may be connected to an independent source of direct current and the rheostat manually operated to effect acceleration.

The magnetic amplifier as is understood enables the control of a relatively large current by a relatively small current, thus enabling the control of large motors by small and very simple switching apparatus.

Figure 2:
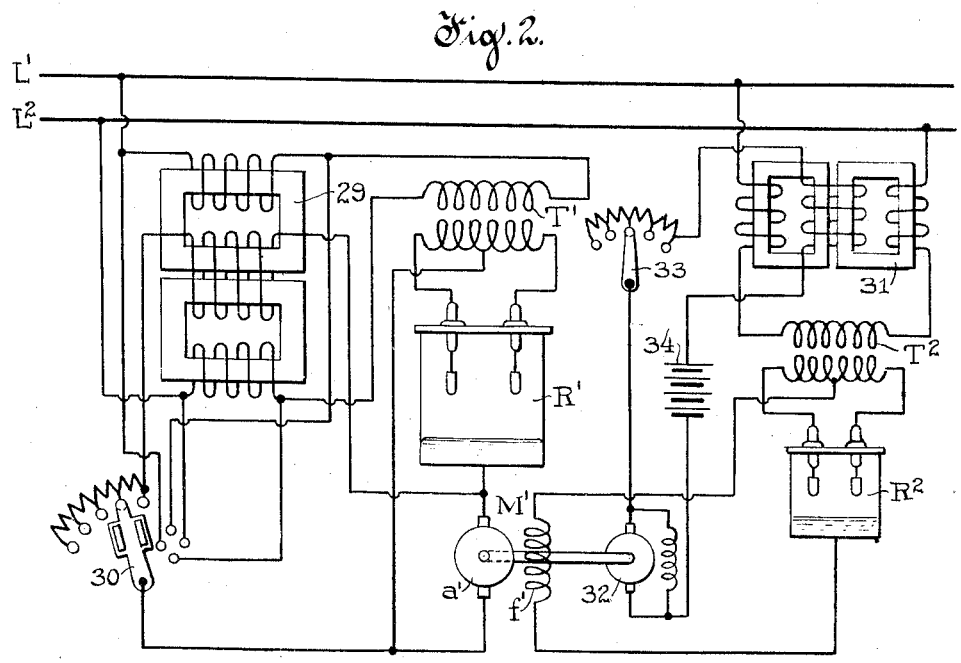
Fig. 2 shows diagrammatically a system of control for a shunt motor.

Referring to Fig. 2, the same illustrates a shunt motor M' having an armature $a'$ and a shunt field $f'$, the armature of said motor being supplied with current from an alternating current source L', L² through a transformer T' and rectifier R' and the rectified current so supplied being controllable by a magnetic amplifier 29 controllable by a rheostat 30. These elements are substantially the same as those shown in Fig. 1, and the circuit connections are such that said elements function in substantially the same way as that above described, but in this instance only to control the current supplied to the motor armature. The motor field is supplied with current obtained from the alternating current supply source through a separate transformer T² and rectifier R², said rectifier being of the type above described. The field is connected between the cathode of said rectifier and a tap on the secondary winding of the transformer and a magnetic amplifier 31 of the type above described is included in circuit between the primary winding of the transformer and the supply circuit for regulation of the rectified current supplied to said field. This amplifier has its direct current winding included in a circuit supplied by a tachometer generator 32 driven by motor M', said circuit also including a rheostat 33 and a battery 34 supplying a potential opposed to that of the tachometer machine but predominated thereby.

Accordingly the control means for the armature provides for automatic acceleration of the motor while the control means for the field provides for speed regulation of the motor and for automatically maintaining substantially constant speed.

Assuming adjustments for a given speed of the motor, a subsequent decrease in its speed, due, for example, to an increase in load, tends to curtail the potential supplied by the tachometer machine 32, thereby decreasing the current supplied to the direct current coil of the amplifier 31. This restricts the current taken from the alternating current source and hence weakens the motor field to restore the motor to normal speed. On the other hand, any increase in the motor speed above normal tends to increase the potential supplied by the tachometer generator 32 to effect field strengthening for return of the motor to normal speed. As will be apparent, the speed of the motor may be adjusted at will through the medium of the rheostats 30 and 33.

What I claim as new and desire to secure by Letters Patent is:

1. In a system of control the combination with a direct current motor of an alternating current supply source, rectifying means through which current is supplied to said motor from said source, and means for varying the impedance of said source in accordance with speed variations of said motor to maintain the speed of said motor substantially constant.

2. In a system of control for direct current motors, in combination, an alternating current supply source, rectifying means through which rectified current is obtained from said source and means including an inductance device controlling the alternating current supply for control of the rectified current, said device having a coil subjected to a unidirectional current variable with the speed of the motor to vary the inductance of said device.

3. In combination, a direct current motor, an alternating current supply source, rectifying means through which rectified current is supplied to said motor from said source, and an inductance device controlling the alternating current supply for control of the motor current, said device having a coil connected in parallel with the armature of said motor to be supplied with rectified current variable with the speed of said motor.

4. In a system of control for direct current motors, in combination, an alternating current supply source, rectifying means through which rectified current is obtained from said source, a magnetic amplifier to vary the current taken from said source to vary the rectified current, said magnetic amplifier having a coil subjected to a unidirectional current variable with the speed of the motor and means for varying the current supplied to said coil at will.

5. In a system of control, the combination with a direct current motor of an alternating current supply source, rectifying means through which rectified current is supplied to said motor from said source and an amplifier controlling the alternating current supply for control of the rectified current, said amplifier having a coil subjected to a control current variable with the speed of said motor for maintaining the speed of said motor substantially constant.

6. In a system of control for direct current motors, in combination, an alternating current supply source, rectifying means through which rectified current is obtained from said source, a magnetic amplifier for effecting control of such rectified current through control of the alternating current supply, said magnetic amplifier including a coil subjected to a unidirectional current, and means for varying the current supplied to said coil for varying the effect of said magnetic amplifier, said means being adapted to also exclude said magnetic amplifier from the supply circuit.

7. In a system of control for direct current motors, in combination, a motor, an alternating current supply source, rectifying means through which rectified current is obtained from said source and a magnetic amplifier for controlling the alternating current supply for control of the rectified current, said magnetic amplifier including inductance coils for the alternating current circuit and a coil to be supplied with a unidirectional current variable in accordance with the speed of said motor, the magnetic field of the latter coil being superimposed upon that of the former coils and the magnetic fluxes produced by said former coils being opposed to minimize the effect thereof on said latter coil.

8. In a control system for a direct current shunt motor, the combination with a shunt motor, of an alternating current supply source, rectifying means for obtaining independent rectified currents from said source for the armature and field of said motor and magnetic amplifiers affording independent control of such rectified currents by variation of the alternating current supply each of said amplifiers having a coil subjected to current variable with the speed of said motor for maintaining the speed of said motor substantially constant.

9. In combination, a direct current shunt motor, an alternating current supply source, rectifying means for obtaining independent rectified currents for the armature and field of said motor from said source, a magnetic amplifier for controlling the alternating current supply for control of the rectified currents supplied to the motor armature, said magnetic amplifier being subjected to a control current variable with the speed of said motor for acceleration of said motor and a magnetic amplifier controlling the alternating current supply for control of the rectified current supplied to the field of said motor, the latter rectifier being subjected to a control current variable with the speed of said motor for maintaining the speed of said motor substantially constant.

10. In combination, a direct current shunt motor, an alternating current supply source, rectifying means for obtaining rectified current for said motor from said source, and a magnetic amplifier controlling the alternating current supply to vary the current supplied to the motor field independently of the current supplied to said motor armature said amplifier having a coil subjected to current variable with the speed of said motor to maintain the speed of said motor substantially constant.

11. In combination, a direct current shunt motor, an alternating current supply source, rectifying means for obtaining rectified current for said motor from said source, a magnetic amplifier controlling the alternating current supply to vary the current supplied to the motor field independently of the current supplied to said motor armature and means including a device driven by said motor for supplying a unidirectional current to said magnetic amplifier varying with the speed of said motor to maintain a substantially constant speed.

In witness whereof, I have hereunto subscribed my name.

ERWIN R. STOEKLE.